3,674,523
OIL MODIFIED CELLULOSIC SAUSAGE CASINGS
Henry J. Rose and Albin F. Turbak, Danville, Ill.,
assignors to Tee-Pak, Inc., Chicago, Ill.
No Drawing. Continuation-in-part of applications Ser. No.
431,181, Feb. 8, 1965, and Ser. No. 763,942, Sept. 30,
1968, now Patent No. 3,607,328. This application Dec.
30, 1970, Ser. No. 102,986
Int. Cl. C08b 21/20
U.S. Cl. 106—168    4 Claims

ABSTRACT OF THE DISCLOSURE

Tubular regenerated cellulose films suitable for use as sausage casings are prepared by incorporating a single vegetable or animal fatty oil or mineral oil in viscose and extruding the resulting mixture into conventional coagulation and regeneration and wash baths. The oil is added in an amount ranging from about 0.1–12% based on the weight of cellulose and is emulsified into the viscose to produce oil droplets in the cellulosic casing having individual particle sizes less than 0.1 mm. in diameter. Cellulosic sausage casings having an oil content and particle size in the range specified are soft and flexible and may be shirred at moisture contents ranging from about 5% to about 20% without the necessity of adding additional moisture to the shirred product, or using shirring lubricant during shirring.

CROSS-REFERENCE TO RELATED APPLICATIONS

This application is a continuation-in-part of patent application Ser. No. 431,181 filed Feb. 8, 1965, now abandoned, and application Ser. No. 763,942 filed Sept. 30, 1968, now U.S. Pat. 3,607,328.

BACKGROUND OF THE INVENTION

Field of the invention

This invention relates to novel cellulosic sausage casings containing a vegetable or animal fatty oil or a mineral oil dispersed therein to provide improved flexibility and improved shirring characteristics. Oil modified cellulosic casings, having the oil introduced into viscose prior to extrusion in the form of casings, are substantially improved in flexibility and elasticity and may be shirred at moisture contents over a wide range without the necessity of adding further moisture to the shirred product, or adding lubricant during shirring.

Description of the prior art

In the art of rayon manufacture and to some extent in the cellophane art, there has been considerable work done in the preparation of delustered regenerated cellulose products, some of which has involved the addition of oils or oily materials to viscose. Kline U.S. Pat. 2,077,700 discloses the use of chlorinated organic materials in delustering rayon. Gloor U.S. Pat. 2,227,495 discloses the use of terpenes and terpene ethers as delustering agents for rayon. Hegan and Taylor U.S. Pat. 1,922,952 discloses the incorporation of mineral oil and sulfonated oils into viscose for the preparation of delustered filaments, threads, and bands. Stockly and Witte U.S. Pat. 1,902,529 discloses the use of waxes in viscose for the preparation of delustered rayon. Hirschberger 1,819,241 discloses the treatment of rayon fibers with solutions of wax in oil. Byron et al. 2,081,847 discloses the application of delustering agents in solution in a volatile organic solvent. Karplus 2,166,741 discloses the introduction of delustering agents in certain volatile organic solvents.

The various types of delusterants described in the rayon art have not proved entirely satisfactory in the preparation of cellulose films or in application to other types of transparent or translucent extruded products.

In our prior related applications, referred to above, we have reported that delustered cellulosic sausage casings may be prepared having a substantially delustering effect and little loss of tensile strength by incorporating into viscose a solution of at least two different delustering agents in a cosolvent which is soluble in viscose. The delustering agents used are substantially immiscible with each other and with viscose and with regenerated cellulose and are added in solution in a cosolvent which is soluble in viscose. The delustering agents have a refractive index which is substantially different from each other and from regenerated cellulose. The delustering agents are preferably vegetable or animal fatty oils and/or mineral oil.

When the solution of two different delustering agents in a cosolvent is dispersed into viscose, it forms a fine emulsion or fog throughout the viscose and the cosolvent dissolves in the viscose to leave behind mixed delusterant particles of substantially smaller size and substantially greater delustering effect than is possible by utilization of delustering agents either singly or applied in combination by other procedures.

SUMMARY OF THE INVENTION

This invention is based upon our discovery that the incorporation of small amounts of single vegetable or animal fatty oils or mineral oil in cellulosic sausage casings results in the production of casings which are self-lubricating, soft, and flexible. The oils are introduced into the casing by incorporating the respective oil in viscose prior to extrusion into a coagulation and regeneration bath. The oil is emulsified into the viscose, preferably by introduction as a solution in a solvent which is soluble in the viscose solution. The oil is emulsified into the viscose in an amount ranging from 0.1 to 12% by weight of the cellulose present and the oil droplets are of a particle size less than 0.1 mm. in diameter (preferably less than 0.01 mm.).

When an animal or vegetable fatty oil or mineral oil is introduced into cellulosic sausage casings in the proportions indicated and in the form of oil droplets of sufficiently small size, the resulting product is internally plasticized and is self lubricating in a variety of applications. The casing may be shirred on commercial shirring machines without the necessity of using additional oil applied to the inside of the casing to prevent shirring damage. Also, the casing can be shirred without damage at moisture contents ranging from 5 to 20% without the necessity of adding further moisture after shirring to permit the stuffing of the casing without breakage.

DESCRIPTION OF THE PREFERRED EMBODIMENTS

This invention comprises new and improved cellulosic sausage casings produced by extrusion of viscose through an annular extrusion die into a conventional coagulation and regeneration bath, followed by conventional washing and plasticizing, which casings have incorporated uniformly therein droplets of an individual particle size less than 0.1 mm. in diameter, of an animal or vegetable fatty oil or a mineral oil, in a concentration ranging from 0.1 to 12% by weight of the cellulose. The oils which may be used include, but are not limited to, animal fatty oils such as lard oil, vegetable fatty oils such as castor oil, corn oil, soya oil, safflower oil, tung oil, etc., or mineral oil, which must be of food grade or acceptable for wood applications. The oils are emulsified into viscose, preferably by adding in the form of a solution in a solvent, such as dioxane, tetrahydrofuran, dimethylformamide, carbon disulfide, dimethyl sulfoxide, etc., which is soluble in the viscose solution. The oil is added as a solution which is dispersed into the viscose as an emulsion or fine droplets. The solvent is rapidly dissolved into the viscose with the result that the oil in solution forms even smaller droplets which are dispersed throughout the viscose. The viscose, with the oil dispersed therein, is extruded through a conventional annular die into coagulating and regenerating baths, in accordance with well known procedures for the preparation of regenerated cellulose casings. After washing, plasticizing, and drying, the casing produced has a milky or opalescent appearance and is highly flexible and soft. The casing may be dried to a moisture content in the range from about 5 to 20% wt. and may be shirred without the addition of additional oil or lubricant to the interior of the casing during a commercial shirring process. Also, the resulting shirred product does not require additional moistening to be stuffed without appreciable breakage by a meat packer.

The following non-limiting examples are illustrative of the scope of this invention.

EXAMPLE 1

A commercial viscose was prepared having a 7.7% cellulose content and used to cast a number of films for evaluating the effectiveness of certain softening materials. A small portion of the viscose was used to hand cast a 22 mil film on a glass plate using a drawbar. The film was coagulated and regenerated using conventional coagulation and regeneration baths. The film produced in this manner had a wet thickness of 3.6 mil and a dry thickness of 1.8–2.0 mil. The film was rewet and tested on an Instron tester for tensile strength. The rewet clear regenerated cellulose film was found to have a tensile strength of 3194 p.s.i.

EXAMPLE 2

A commercial viscose was prepared having a 7.7% cellulose content, as in Example 1. To this viscose, there was added a solution consisting of 1 part mineral oil admixed with 1 part tetrahydrofuran in an amount sufficient to produce an oil concentration in the viscose of 4% by weight calculated on the weight of cellulose present. The mineral oil in solution in tetrahydrofuran was mixed thoroughly into the viscose to produce a milky dispersion of the mineral oil.

The mixture of oil and viscose was then used to cast a 22 mil film on a glass plate using a drawbar, as in Example 1. The film was coagulated and regenerated using conventional coagulation and regeneration baths. The film thus produced had a wet thickness of 3.7 mil and a dry thickness of 2.4 mil. The film was rewet and tested in an Instron tester, as in Example 1, and found to have a tensile strength of 2265 p.s.i.

The oil-modified regenerated cellulose film thus produced was observed for delustering effect and found to have a rather poor delustering. The film was observed under a microscope and found to have oil particles ranging from 0.02 to 0.12 mm. in diameter, with the larger droplets predominating. The droplets appear to be transparent under magnification but give a relatively opaque appearance to the film with a rather poor delustering effect.

When the mixture of oil and viscose prepared in this example is extruded through an annular die into a conventional coagulating and regenerating bath, a tubular casing is obtained having oil droplets uniformly dispersed throughout the wall thickness thereof. The casing is washed, plasticized, and dried using conventional processing equipment for the manufacture of cellulosic casings. The oil-modified cellulosic casing is soft and flexible and can be shirred on a commercial shirring machine without the necessity of introducing oil through the shirring mandrel to lubricate the inner surface of the casing as is necessary in the case of cellulosic casings which have not been treated with oil. Also, the oil-modified casing may be shirred at moisture contents in the range from about 5 to 20% without the necessity of further moistening the shirred casing. The casing may be stuffed by a meat packer at the initial moisture content used during shirring without danger of casing breakage.

EXAMPLE 3

In this example, a commercial viscose, 7.7% cellulose content was mixed with a vegetable oil, castor oil, to determine the effect of the oil on casing film properties. A solution was prepared consisting of 1 part of castor oil and 1 part of tetrahydrofuran. A sufficient quantity of the solution was added to the viscose and thoroughly mixed therein to produce a dispersion of castor oil in a concentration of 4% based on the cellulose content present. The oil treated viscose was used to cast a 22 mil film on a glass plate using a drawbar as in the previous examples. The cast film was subjected to a conventional coagulation and regeneration treatment (ammonium sulfate and sulfuric acid) as in the other examples. The film had a wet thickness of 3.8 mil and a dry thickness of 1.9 mil. The film was rewet and measured for tensile strength on an Instron tester. The castor oil modified film had a rewet strength of 2621 p.s.i.

The castor oil modified film was evaluated both by macroscopic and microscopic visual examination. On the macroscopic level, the film was observed to have a weak luster but a lowered light transmission (loss of brightness), the delustering effect was rather poor. On the microscopic level, the castor oil dispersion in the regenerated cellulose film was observed to consist of oil droplets ranging from 0.01–0.02 mm. in diameter. These droplets are relatively clear optically on a microscopic level but tend to opacify the film slightly.

When the castor oil-modified viscose is extruded through an annular die into a conventional coagulating and regenerating bath there is produced a tubular cellulosic casing. The casing is subjected to conventional washing, plasticizing and drying steps as used in the production of commercial regenerated cellulose casings.

The castor oil-modified casing is soft and flexible and has a very high elongation at break. The casing is internally self-lubricating and may be shirred on a commercial shirring machine without the necessity of adding oil internally through the shirring mandrel as is the case for cellulosic casings which have not been treated with oil. The oil-modified casing may be shirred at moisture contents ranging from about 5% up to about 20% without the necessity of adding additional moisture to the shirred casing in order that the casing stuff without excessive breakage.

EXAMPLE 4

In this example, a study was made of the effect of two different oils added separately to viscose. A commercial viscose, 7.7% cellulose content, was used in the previous examples and divided into two separate parts. Two separate solutions were prepared consisting of 1 part of mineral oil in 1 part tetrahydrofuran and 1 part castor oil in 1 part tetrahydrofuran. The mineral oil solution was added and thoroughly mixed in one of the viscose aliquots. The castor oil solution was added and thoroughly mixed in the other aliquot and the resulting viscose oil solutions were then mixed together. The mineral oil and castor oil were each added in an amount equal to 2% of each based on the weight of cellulose in the total solution.

The mixture of oils and viscose was cast on a glass plate with a drawbar producing a 22 mil wet film. After coagulation and regeneration with a conventional ammonium sulfate and sulfuric acid treatment, there was obtained a regenerated cellulose film having a wet thickness of 3.6 mil and a dry thickness of 2.0 mil. This film was rewet and tested for tensile strength on the Instron tester. The film had an average tensile strength of 2700 p.s.i.

The regenerated cellulose film containing mixed droplets of mineral oil and castor oil was evaluated both on a microscopic and macroscopic level for delustering. The luster of the film was quite weak when observed on a macroscopic level. When the film was observed in the microscope it was found to have a plurality of separate mineral oil and castor oil droplets ranging in size from 0.02 to 0.06 mm. The individual oil droplets were relatively clear optically. This film was observed to have a moderately good delustering but was too transparent to be satisfactory for commercial use.

While the regenerated cellulose film produced in accordance with this example is not as completely delustered as might be desired for some purposes, the oil treated film has properties that are particularly desirable in shirred cellulosic casings, particularly those of the type used in the processing of frankfurter and other small sausages. When the oil-modified viscose mixtures, prepared as described in this example, are extruded through an annular die into a coagulating and regenerating bath there is produced a tubular cellulosic casing suitable upon further processing for use as a frankfurter casing. The coagulated and regenerated casing is washed, plasticized, and dried using procedures conventional for the preparation of regenerated cellulose sausage casings. The casing which is thus produced has uniform oil droplets of small size dispersed in the walls thereof. The casings can be shirred on a commerical shirring machine without the necessity of introducing oil through the shirring mandrel to lubricate the interior surface of the casing as is the case when cellulosic casings are shirred which have not been subjected to the oil treatment of this invention. The oil treated casings are dried, at the time of manufacture, to a moisture content in the range from about 5 to 20% and can be shirred at this moisture level without the necessity of remoistening the shirred casing. Casings which have not been treated with oil in accordance with this invention generally must be shirred at a moisture content of about 7 to 10% and then the shirred casing subjected to a further moistening treatment to bring the moisture content up to about 15–20%. The oil treated casings of this invention are sufficiently flexible to be shirred on commercial shirring equipment at low moisture contents and do not break during stuffing as usually occurs in the case of cellulosic casings which are too dry.

EXAMPLE 5

A commercial viscose is prepared having a 7.7% cellulose content. To this viscose, there was added a solution consisting of 4.5 parts wt. mineral oil and 4.5 parts wt. castor oil in 91 parts wt. of tetrahydrofuran. The solution was finally dispersed in viscose in an amount sufficient to produce a mixed oil content of 0.6% based on the weight of regenerated cellulose product.

The mixture of oils in viscose was extruded through an annular die to produce a tubular casing in accordance with well known procedures for the preparation of regenerated cellulose casing. The viscose-oil mixture was extruded through a die into a conventional coagulating and regenerating bath and subsequently washed, plasticized, and dried.

The washing and drying of the regenerated cellulose casing was effective to remove all of the tetrahydrofuran from the product and produce a soft very flexible cellulosic casing. When the solvent is washed and/or evaporated from the regenerated cellulose casing, there are formed a large quantity of small particles or droplets dispersed uniformly throughout the wall of the casing. The removal of the solvent, which is dissolved in the viscose, effects the production of extremely fine opalescent particles or droplets dispersed to yield a more supple casing film.

Casing manufactured in accordance with this example has mixed oil droplets present which are less than 0.1 mm. in diameter and which plasticize the casing film and lubricate the film to make it possible to shirr the casing without the necessity of internal oiling on a commercial shirring machine.

EXAMPLE 6

A commercial viscose was prepared having a 7.7% cellulose content. To this viscose, there was added a solution consisting of 9% wt. mineral oil in tetrahydrofuran, to which there may optionally be added a small amount of a food grade surfactant such as an ethoxylated fatty acid. The solution of mineral oil in tetrahydrofuran was finally dispersed in the viscose in an amount sufficient to produce an oil content of 0.6% on the weight of the regenerated cellulose product.

The mixture of oil and viscose was extruded through an annular die to produce a tubular casing in accordance with well known procedures for the preparation of regenerated cellulose casing. The viscose-oil mixture was extruded through a die into a conventional coagulating and regenerating bath and subsequently washed, plasticized, and dried.

When the oil solution was mixed with the viscose, the solvent dissolved throughout the viscose and caused the formation of an emulsion of very small uniformly dispersed droplets. The washing and drying of the regenerated cellulose casing was effective to remove all of the tetrahydrofuran solvent from the product and produce a highly plasticized self-lubricating cellulosic casing containing a dispersion of oil droplets of 0.003–0.010 mm. diameter. When the solvent was washed from and/or evaporated from the regenerated cellulose casing, there were formed a large quantity of droplets of a diameter substantially less than 0.1 mm. dispersed uniformly throughout the wall of the casing.

The casing produced in accordance with this example was dried to a moisture content in the range from about 5 to 20% wt. The casing thus produced was soft and flexible and could be shirred on a commercial shirring machine without the necessity of introducing additional oil or other lubricant to the interior of the casing and without the necessity of further moistening or humidifying the shirred casing after shirring and packaging.

EXAMPLE 7

A commercial viscose was prepared having a 7.7% cellulose content. To this viscose, there was added a solution consisting of 9% wt. castor oil in tetrahydrofuran, to which there may optionally be added a small amount of a food grade surfactant such as an ethoxylated fatty acid. The solution of castor oil in tetrahydrofuran was finally dispersed in the viscose in an amount sufficient to produce an oil content of 0.6% on the weight of the regenerated cellulose product.

The mixture of oil and viscose was extruded through an annular die to produce a tubular casing in accordance with well known procedures for the preparation of regenerated cellulose casing. The viscose-oil mixture was extruded through a die into a conventional coagulating and regenerating bath and subsequently washed, plasticized, and dried.

When the oil solution was mixed with the viscose, the solvent dissolved throughout the viscose and caused the formation of an emulsion of very small uniformly dispersed droplets. The washing and drying of the regenerated cellulose casing was effective to remove all of the tetrahydrofuran solvent from the product and produce a highly plasticized self-lubricating cellulosic casing. When the solvent was washed from and/or evaporated from the regenerated cellulose casing, there was formed a large quantity of droplets of a diameter substantially less than 0.01 mm. dispersed uniformly throughout the wall of the casing.

The casing produced in accordance with this example was dried to a moisture content in the range from about 5 to 20% wt. The casing thus produced was soft and flexible and could be shirred on a commercial shirring machine without the necessity of introducing additional oil or other lubricant to the interior of the casing and without the necessity of further moistening or humidifying the shirred casing after shirring and packaging.

In producing improved oil-modified casings in accordance with this invention, it has been found that the animal or vegetable fatty oils or mineral oil may be added to the casing by mixture with viscose prior to extrusion of the casing in amounts ranging from 0.1 to 12% wt. based on the regenerated cellulose casing without substantial loss in casing strength so long as the oils are emulsified to a particle size less than about 0.1 mm. (preferably less than 0.01 mm.). The oils are preferably introduced into the viscose prior to extrusion in the form of a solution in a solvent which is both volatile and thoroughly soluble in viscose. Both properties are necessary to produce an adequate dispersion of the oil in sufficiently fine droplets to produce the desired effect in the casing. The oil-modified casings produced in accordance with this invention are more flexible and elastic than casings which have not been oil modified. The oil-modified casings can be shirred on commercial shirring machines without the necessity of internal lubrication applied through the shirring machine mandrel as is required in the case of cellulosic casings which have not received the oil treatment. Also, the oil treated casings can be shirred at a moisture content of 5-20% wt. and do not require additional moisturizing or humidification to prevent breakage of the casing during stuffing by the meat packer.

We claim:
1. A shirred tubular regenerated cellulose sausage casing having a vegetable or animal fatty oil or a mineral oil dispersed in the walls thereof in a concentration of 0.1-4% wt., based on the cellulose, in the form of droplets substantially all of which are about 0.003-0.06 mm. in diameter, and a moisture content of 5-20% wt.
2. A casing in accordance with claim 1 in which the oil is mineral oil.
3. A casing in accordance with claim 1 in which the oil is castor oil, corn oil, soya oil, safflower oil or tung oil.
4. A casing in accordance with claim 1 in which the oil is lard oil.

References Cited
UNITED STATES PATENTS

| | | | |
|---|---|---|---|
| 2,166,740 | 7/1939 | Karplus | 106—166 |
| 1,956,034 | 4/1934 | Kline | 106—166 |
| 2,182,188 | 12/1939 | Waiter | 106—166 X |
| 2,081,847 | 5/1937 | Byron et al. | 106—166 |

THEODORE MORRIS, Primary Examiner

U.S. Cl. X.R.
99—176; 106—166